Figure 1:
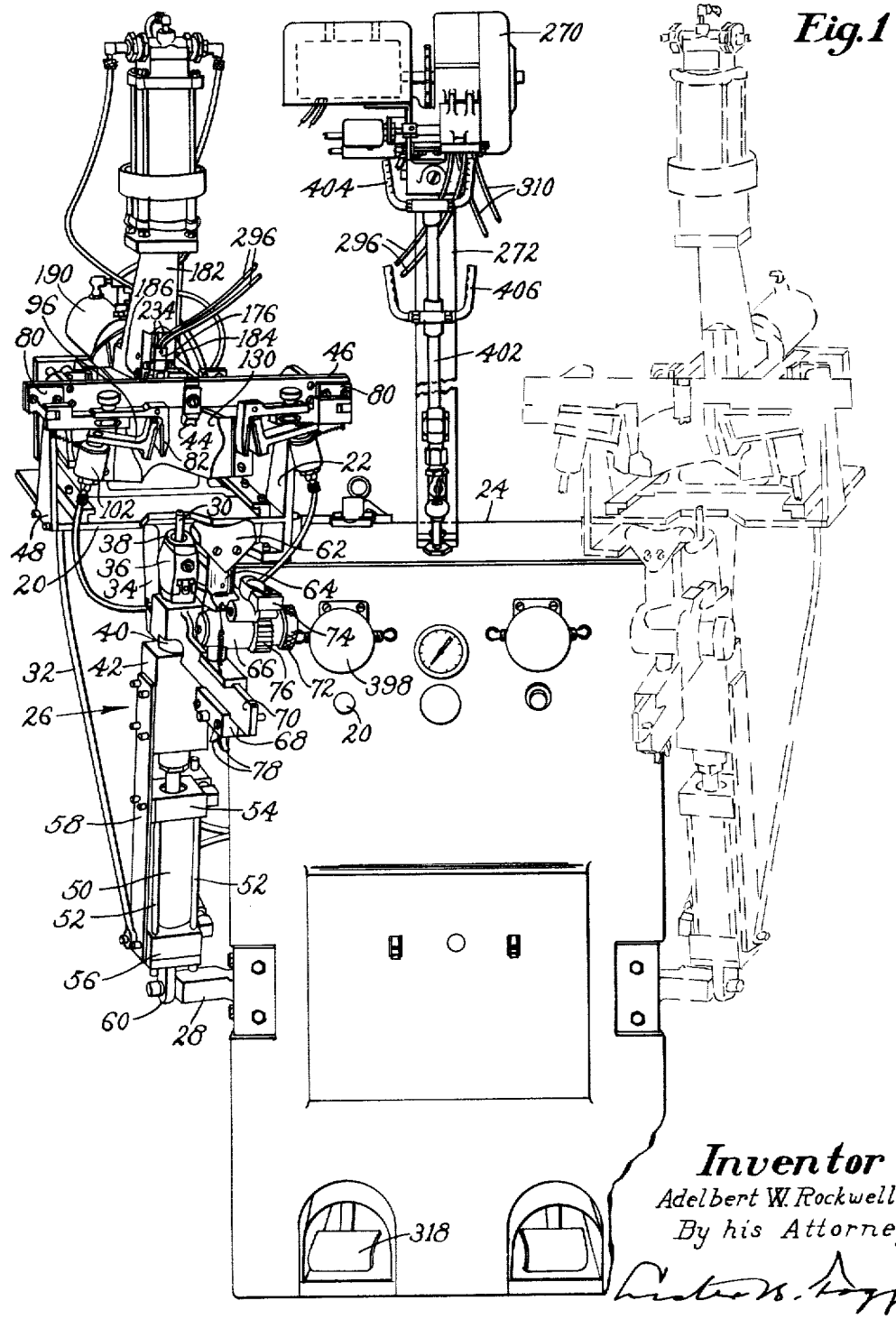

July 9, 1963  A. W. ROCKWELL, JR  3,096,531
HEEL END ASSEMBLING AND BACKPART MOLDING MACHINE
Filed Oct. 12, 1961  6 Sheets-Sheet 1

Inventor
Adelbert W. Rockwell Jr
By his Attorney

July 9, 1963  A. W. ROCKWELL, JR  3,096,531
HEEL END ASSEMBLING AND BACKPART MOLDING MACHINE
Filed Oct. 12, 1961  6 Sheets-Sheet 5

July 9, 1963 A. W. ROCKWELL, JR 3,096,531
HEEL END ASSEMBLING AND BACKPART MOLDING MACHINE
Filed Oct. 12, 1961 6 Sheets-Sheet 6

United States Patent Office 3,096,531
Patented July 9, 1963

3,096,531
HEEL END ASSEMBLING AND BACKPART MOLDING MACHINE
Adelbert W. Rockwell, Jr., Beverly, Mass., assignor to United Shoe Machinery Corporation, Flemington, N.J., a corporation of New Jersey
Filed Oct. 12, 1961, Ser. No. 144,635
19 Claims. (Cl. 12—10.2)

This invention relates to shoe machines and is herein illustrated in its application to machines for assembling shoe upper parts on their lasts and molding the back parts or heel end portions of the upper materials upon the heel portion of the last.

In the manufacture of shoes according to practices which contemplate the performance of a backpart molding operation it has been the usual custom to mold the back part before the shoe upper materials are mounted on the last, and in an operation distinct and separate from the molding operation to assemble the shoe upper materials with the last on which the shoe is to be made and to fasten them to the heel end portion of an insole on the last bottom. It is an object of the present invention to provide a machine which will mold the back parts of shoe upper materials to the heel end portion of the last on which the shoe is to be made and drive the fastenings for securing the upper materials in assembled relation to an insole on the last bottom. The provision of such a machine not only reduces the cost of the assembling and back part molding operations but also insures the faithful reproduction in the back parts of the shoe upper materials of the shape of the last on which the shoe is to be made.

With the above and other objects in view as will hereinafter appear, the present invention, in one aspect thereof, contemplates the provision in a shoe machine having means for supporting a last and a shoe upper thereon of a heel band for bringing the shoe upper materials into intimate contact with the heel end portion of the last and wiping means, herein illustrated as a plurality of wiper members, for wiping the lasting margins of the shoe upper materials inwardly over an insole on the last bottom preparatory to the attachment of the overwiped materials to the insole. The heel band is supported in a carriage which is suitably mounted for movement lengthwise of a last in the machine toward and from its heel end, and the wipers are mounted in a carrier which is mounted in the carriage for movement relatively to the carriage lengthwise of the last to effect the overwiping operation. Preferably, the upper is tensioned toewardly preparatory to the operation of the heel band and the wipers by grippers constructed and arranged to engage the upper at opposite sides thereof. In the illustrated organization the grippers are moved toewardly to apply tension to the upper materials by means herein illustrated as springs which are rendered operative by the initial advancement of the heel band carriage. For fastening the overwiped shoe upper materials to the heel end of an insole on the last bottom, suitable tack drivers are mounted in the wiper carrier together with means for operating the drivers. For operating the lasting wipers a pair of levers is fulcrumed on the wiper carrier and suitable means is provided for causing relative movement of the wiper carrier and the heel band carriage to effect the operation of the levers. In the illustrated machine the last is supported by a jack which moves heightwise of the last from a loading position to locate the last and the shoe upper materials thereon relatively to the operating instrumentalities of the machine. Means herein illustrated as a fluid pressure operated piston is provided for elevating the jack, and return movement of the jack to its loading position is initiated by means, herein illustrated as a valve, operated by the return movement of the heel band carriage.

The invention is illustrated in the drawings in its application to a two-station machine constructed and arranged for tandem operation and characterized by a tack supplying organization common to the two-station machine. For effecting delivery of tacks alternately to the two stations from a common tack pot the present invention contemplates the provision of a fixed member or block having passages which receive tacks from raceways communicating with the tack pot and a tube carrier mounted in the block for shifting movement to effect the transfer of tack delivery from one station to the other. The tubes are so mounted in their carrier that shifting movement of the carrier causes tubes for the respective stations to be alternately presented to the tack passages in the block. The supply of tacks to the operating station is effected by the operation of a separator which takes tacks one by one from the raceways and transmits them to the passages in the block.

These and other features of the invention will now be described with reference to the accompanying drawings and pointed out in the appended claims.

Figure 2:
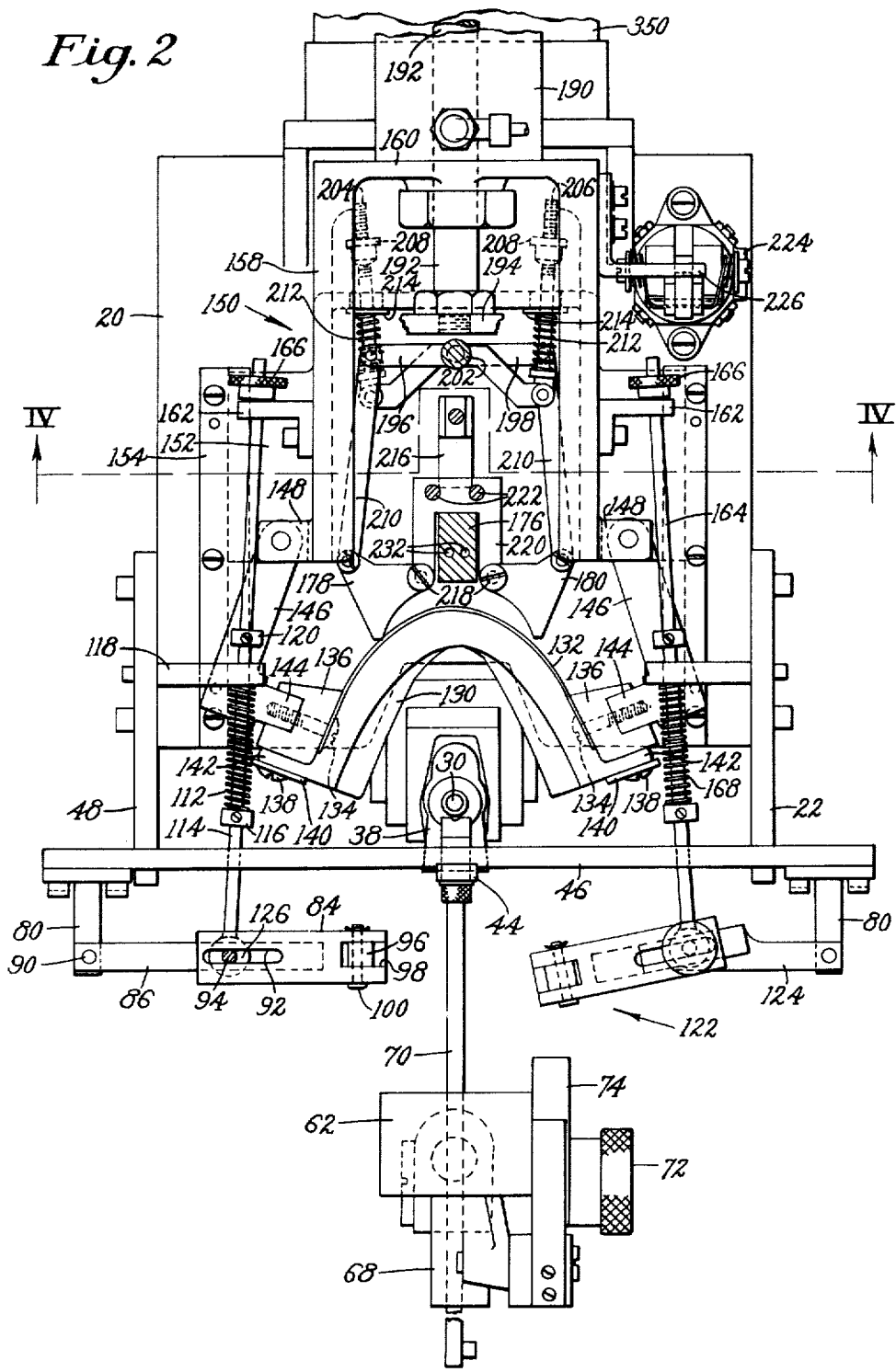
Figure 3:
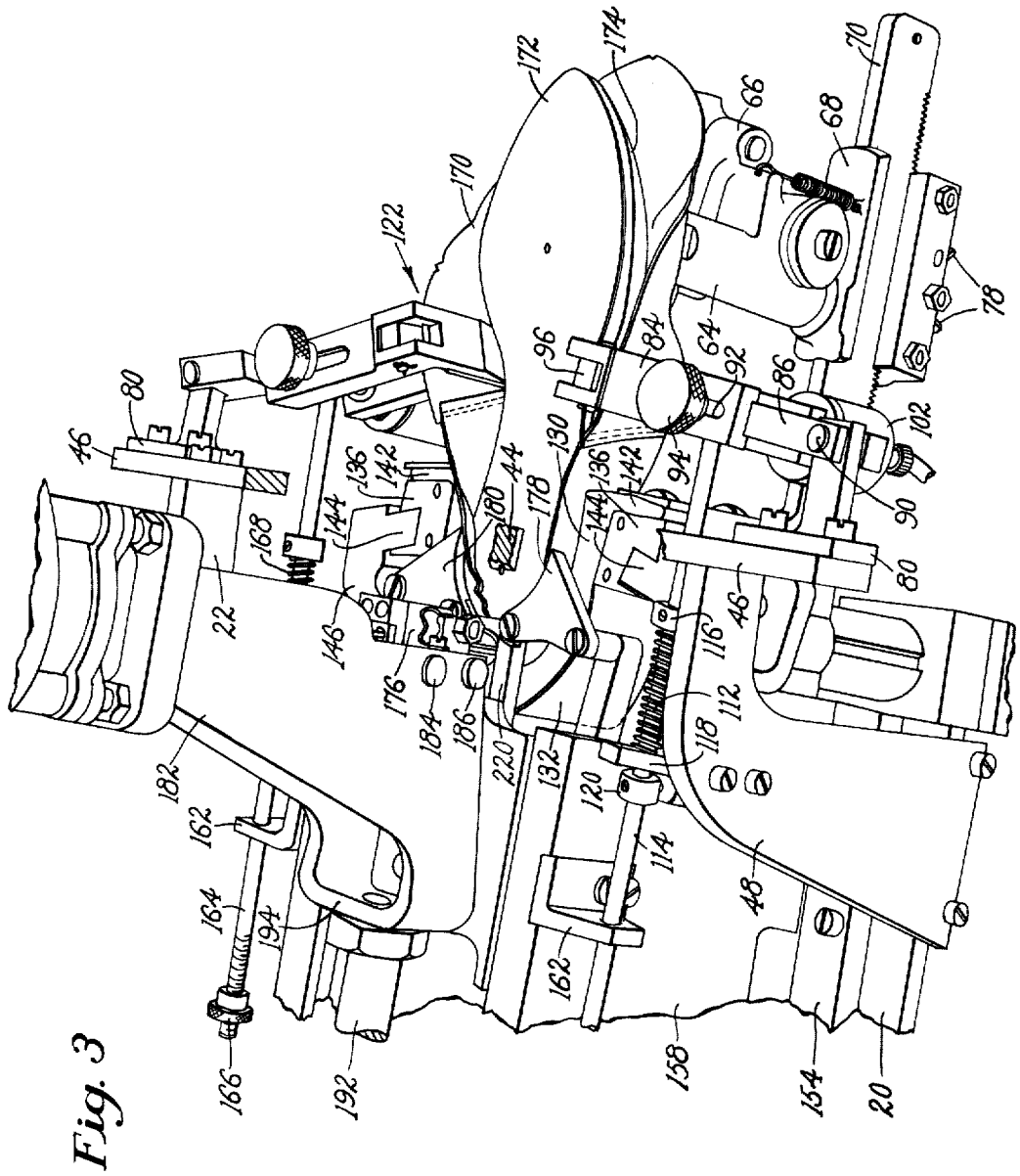
Figure 4:
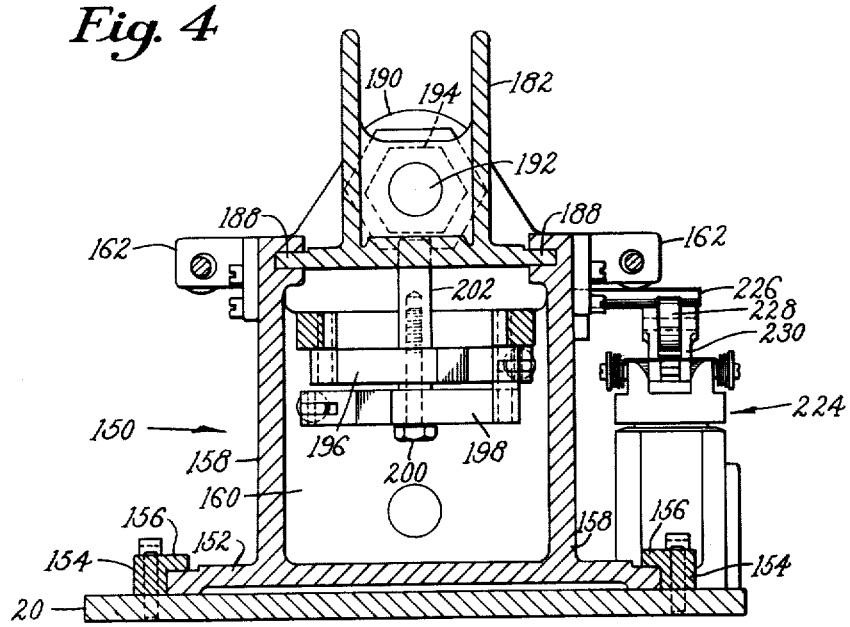
Figure 5:
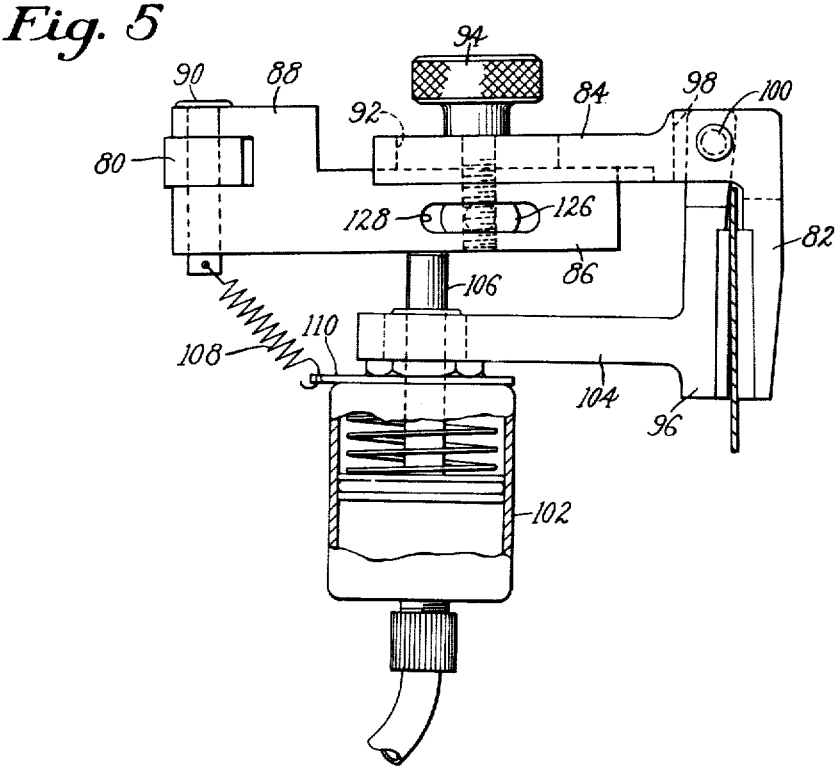
Figure 6:
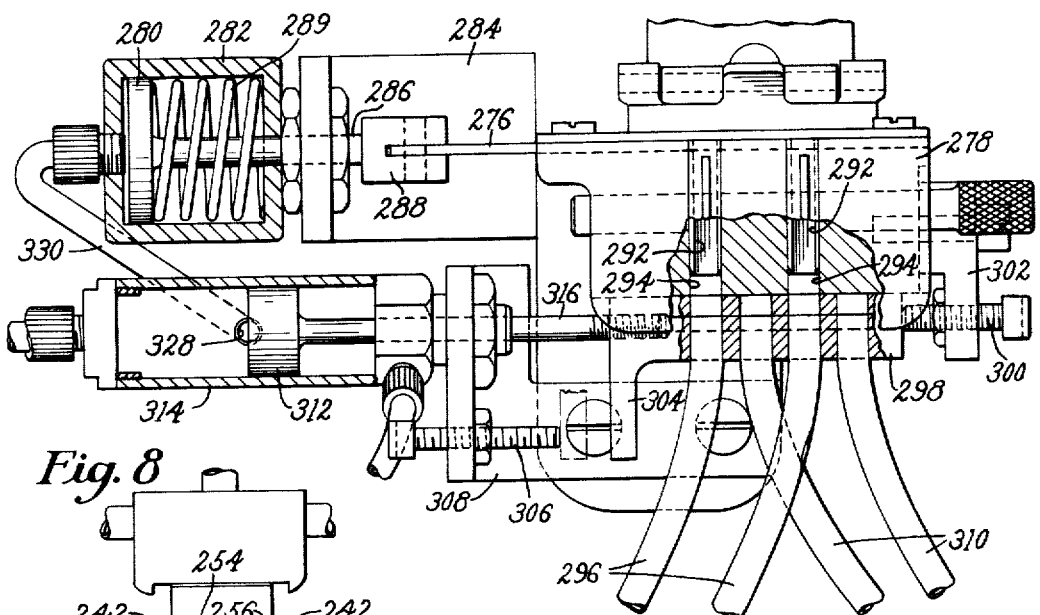
Figure 8:
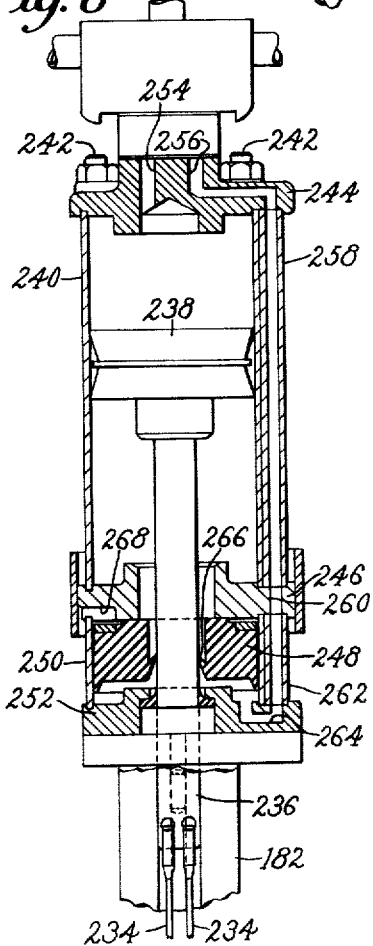
Figure 7:
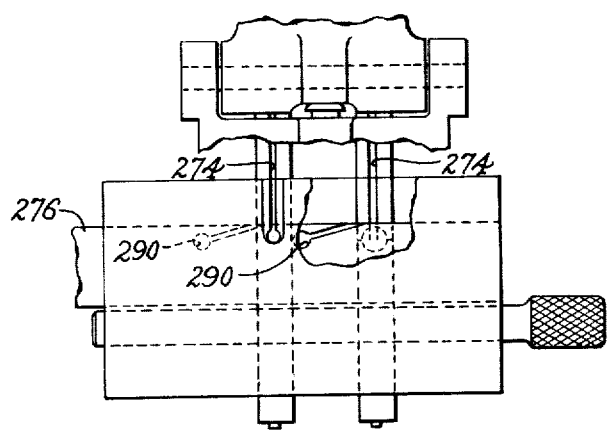
Figure 9:
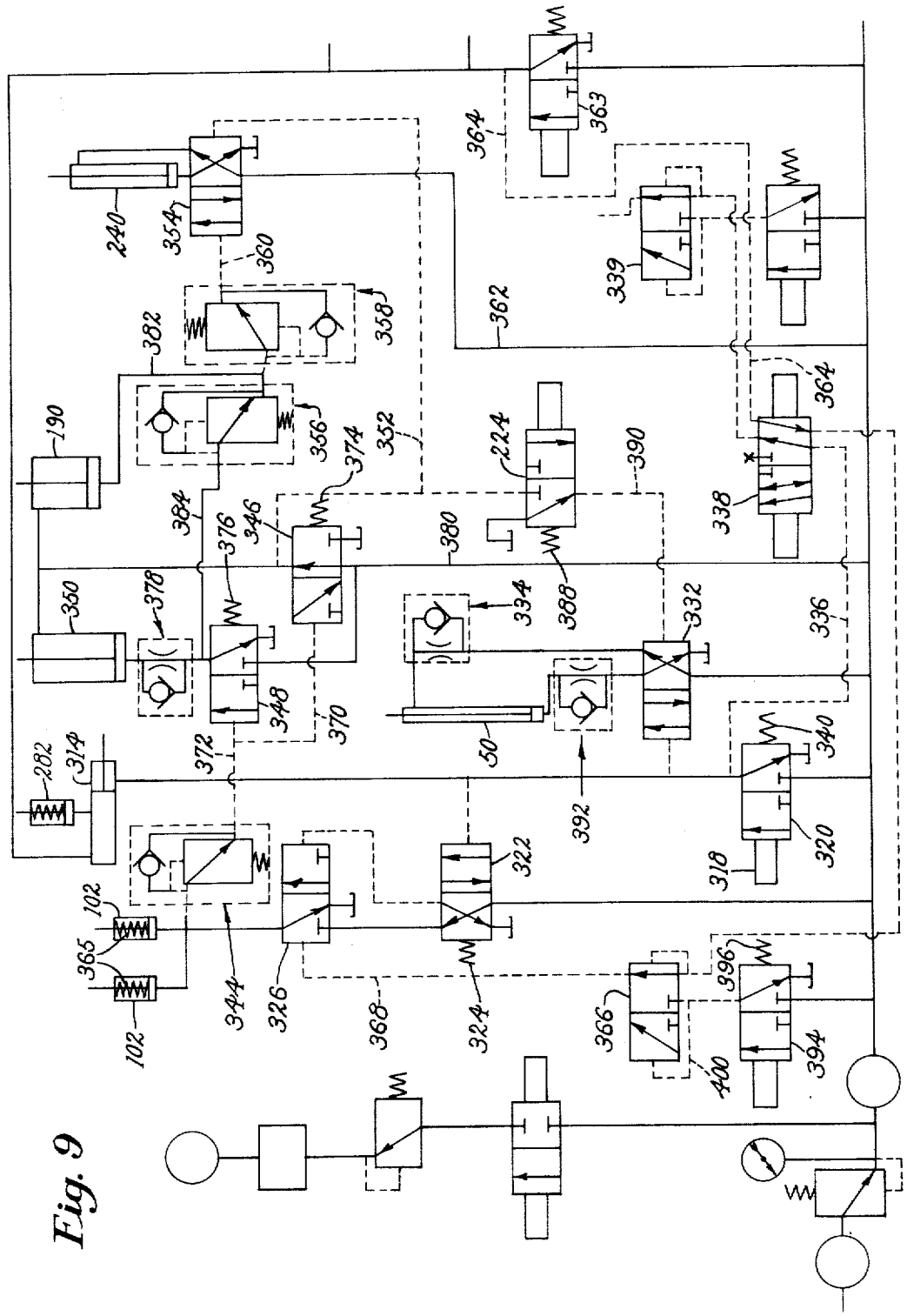

In the drawings:
FIG. 1 is a front elevation illustrating a machine embodying the features of the present invention;
FIG. 2 is a plan view illustrating one station of the machine;
FIG. 3 is a perspective view with parts broken away illustrating the station shown in FIG. 2 with a last and a shoe upper positioned therein;
FIG. 4 is a section on the line IV—IV of FIG. 2;
FIG. 5 is an enlarged view in front elevation illustrating the left side gripper;
FIG. 6 is an enlarged view in front elevation, partly in section, illustrating parts of the tack supplying mechanism;
FIG. 7 is an enlarged plan view illustrating the tack selector mechanism shown in FIG. 6;
FIG. 8 is an enlarged front elevation largely in section in a plane common to the axis of the tack driving piston, illustrating features of the tack driving mechanism and;
FIG. 9 is a diagrammatic view of the valve assembly.

Referring to FIG. 1 the invention is illustrated as embodied in a two-station machine for assembling shoe uppers on their lasts and shaping the heel end portions of the shoe upper materials. Inasmuch as the two stations are identical in construction and operation the following description of the station at the left of the machine will be understood to apply equally wall to the opposite station.

As shown in FIG. 1 a plate 20 which mounts parts of the operating unit at the left side of the machine is fixed to the upstanding portion 22 of an angle bracket secured to the top of a cabinet 24 in an angular position such that the said operating unit confronts an operator standing in front of the center of the cabinet. For supporting a last in inverted position a jack assembly 26 is mounted at its lower extremity on a bracket 28 secured to the side frame of the cabinet 24. At its upper extremity the jack is provided with a last pin 30 on which the inverted last is received. For supporting the outwardly extending portion of the base plate 20 there is secured to the lower portion of the jack 26 a strut 32 extending upwardly and rearwardly and having its upper end portion secured to the bottom surface of the base plate. At its upper extremity the jack 26 has secured thereto a yoke 34, the flanged upper end portion of which is secured to the bottom of the base plate to provide support for the upper portion of the jack. Thus it will be seen that the jack is mounted for vertical movement only, and is held against movement in the direction of the length of a last mounted on the pin 30. The last pin is mounted in an assembly 36 for angular movement widthwise and lengthwise of the last to permit the last to be suitably disposed relatively to the operating instrumentalities. The last is supported by the engagement of its plane cone face with the flat upper surface of a plate 38 which is mounted for universal angular movement in the last pin assembly. For a detailed description of the construction and operation of the last pin assembly reference may be had to United States Letters Patent No. 2,268,597, granted January 6, 1942, on an application filed in the name of Jacob C. Jorgensen. The last pin assembly is secured to the upper end portion of a shaft 40 which slides vertically in a bearing block 42 to move the last upwardly into a position in which an insole thereon bears against a holddown herein illustrated as a bracket 44 secured to a cross head 46, the right end portion of which is secured to the bracket 22 and the left end to a similar bracket 48 secured to the base plate 20. For imparting upward movement to the shaft 40 a piston (not shown) is mounted in a cylinder 50 confined by tie rods 52 between upper and lower heads 54 and 56. Said heads together with the block 42 are secured to a plate 58 and the lower head 56 serves as a mounting for a T-shaped bracket 60 whereby the lower portion of the jack assembly is secured to the bracket 28. For supporting the toe portion of the last and a shoe upper mounted thereon a suitable toe pad 62 is mounted on a shaft (not shown) arranged for sliding movement in the upstanding cylindrical portion 64 of a casting 66 secured to a carriage 68 slidably mounted for movement lengthwise of the last on a horizontal arm 70 secured to and extending forwardly from the shaft 40. The toe pad is adjusted vertically by turning a knurled knob 72 which operates a pinion which meshes with rack teeth in the vertical shaft. A detent 74 is arranged to engage a ratchet wheel 76 thereby to support the toe pad against downward movement. For holding the carriage 68 in its adjusted position on the arm 70 a suitable detent (not shown) mounted in the carriage is arranged to engage teeth formed in the lower portion of the arm 70 and a pair of finger levers 78 mounted in the carriage serve to retract the detent in order to permit horizontal adjustment of the carriage on the arm. The illustrated toe supporting mechanism is generally similar to that shown in United States Letters Patent No. 1,770,976, granted July 22, 1930, on an application filed in the name of Joseph Fausse. Suitable means (not shown) is provided for holding the shaft 40 against rotation in order to maintain the illustrated orientation of the toe supporting assembly.

As the jack moves upwardly to bring the sole on the last bottom into engagement with the holddown 44 the upper materials at opposite sides of the last are directed into the jaws of two grippers arranged at opposite sides of the shank portion of the last. The grippers are pivotally mounted on brackets 80 (FIG. 1) secured to and projecting forwardly from opposite end portions of the cross head 46. Referring to FIG. 5 illustrating the left gripper assembly, the illustrated gripper comprises a stationary jaw 82 depending from the outer end of a channel member 84 mounted for adjustive movement endwise thereof on an arm 86 having a notched head portion 88 which receives a hinge pin 90 whereby it is connected to the bracket 80. The channel member 84 is slotted at 92 to receive a knurled headed clamping screw 94 which secures the jaw 82 in adjustive relation to the arm 86. Cooperating with the jaw 82 is a movable jaw 96 which is extended upwardly into a slot 98 in the channel member 84 and pivotally mounted on a pin 100. For advancing the jaw 96 into gripping engagement with upper materials positioned between the two jaws a pneumatically operated piston and cylinder assembly 102 is secured to an arm 104 projecting from the gripper jaw 96.

The piston rod 106 is extended to engage the bottom edge face of the arm 86 so that the operation of the piston and cylinder assembly causes the cylinder to move downwardly with the arm 104, thereby closing the gripper jaws. During the retraction of the piston the jaw 96 is swung into its open position by the contraction of a spring 108, one end of which is anchored to the hinge pin 90 and the other end to a plate 110 incorporated in the piston and cylinder assembly. If desired, the lower surface of the channel member 84 at the junction of the jaw 82 may serve as a gage for determining the position of the upper materials heightwise thereof relatively to the gripper jaws. The closed gripper is urged forwardly to tension the upper materials toewardly thereof by the expansion of a spring 112 (FIG. 2) surrounding a rod 114 and confined between a collar 116 fixed to the rod and a bracket 118 secured to the bracket 48 and provided with an aperture through which the rod extends. The spring is loaded during the latter part of the machine cycle for operation in the next succeeding cycle as hereinafter described. The toeward movement of the gripper is limited by a collar 120 secured to the rod 114 and arranged to engage the rear face of the bracket 118. At its forward end the rod 114 is provided with an eye 126 which, as shown in FIG. 5, is inserted into a slot 128 formed in the arm 86 and is arranged to receive the clamping screw 94.

The construction and operation of the right gripper assembly 122 will be understood from the foregoing description, the only difference between the two grippers consisting in the angular construction of the arm 124 in the right gripper assembly which provides a better disposition of the gripper jaws for engagement with the upper materials at the inside of the shank portion of the upper.

For shaping or molding the heel end portion of the upper materials against the heel end of a last supported on the last pin 30 the illustrated machine is provided with a heel band or block 130 which is preferably molded from any suitable plastic substance. The shoe upper materials preferably include a heel stiffener or counter made of a suitable thermoplastic material which will set to the shape of the heel end of the last upon the dissipation of heat therefrom. Referring to FIG. 2, the illustrated heel band is backed up by a thin flexible metal plate 132 which is secured at its opposite end portions by headed screws 134 to blocks 136. These blocks also serve for the mounting of the heel band by headed screws 138 extending through metal plates 140 and outwardly extending flanges 142 of the heel band. The screws 134 extend through a recessed portion of the blocks 136 and into the end portions of short arms 144 of L-shaped members 146. At their rear ends the L-shaped members are pivotally mounted on lugs 148 projecting outwardly from the forward extremity of a carriage 150 whereby the heel band is advanced into upper shaping position. The L-shaped members normally diverge forwardly from their pivotal connection with lugs 148. When the machine is at rest the backing plate 132 normally holds the heel band in its outspread position illustrated in FIG. 2. During the advancement of the carriage 150 the heel band remains in its outspread position until its central portion engages the back line portion of a shoe upper on the last and continued advancement of the carriage thereafter causes the L-shaped members 146 to swing toward each other against the resistance of the backing plate 132 causing the heel band to close against opposite sides of the heel portion of the upper. The inner surface of the heel band is generally complemental in shape to the heel end portion of the last and the carriage 150 is advanced with sufficient force to cause the heel band to conform the heel end portion of the shoe upper materials including the heel stiffener to the heel end of the last. Referring to FIG. 4, the illustrated carriage comprises a base portion 152 mounted for sliding movement lengthwise of a shoe in the machine on the base plate 20. For guiding the movements of the carriage on the base plate suitable gibs 154 are secured to the base plate so that vertical surfaces thereof engage the edge faces of the base 152 and their inwardly directed flanges 156 bear against machined upper surfaces of the base. Projecting upwardly from the base is a frame or housing comprising parallel side walls 158 and a rear end wall 160. As shown in FIG. 2 the lugs 148 extend outwardly from the upper portions of the side walls. Also mounted on the side walls are brackets 162 spaced rearwardly from the lugs 148 and drilled to receive the rear end portions of the rod 114 and the corresponding rod 164 at the right side of the machine. The rear end portions of the rods 114 and 164 are threaded to receive knurled thumb nuts 166. During the rearward movement of the carriage 150 into its rest position illustrated in FIG. 2 the brackets 162 engage the thumb nuts 166 and move the rods 114 and 164 rearwardly, thereby to load the spring 112 on the rod 114 and a similar spring 168 on the rod 164.

For wiping the lasting margins of the upper materials at the heel end of a shoe upper, such, for example, as the upper 170 illustrated in FIG. 3, inwardly over the margin of an insole 172 fastened to the bottom surface of a last 174 the illustrated machine is provided with three wiper members illustrated in FIG. 2 comprising a central or back line wiper which, in the illustrated organization, is the bottom surface of a tack driver block 176 and two side wipers 178 and 180 which advance together with the tack driver block in their open or expanded position illustrated in FIG. 2 to overwipe the extremity of the heel end portions of the upper materials. During the latter part of their advancing movement the side wipers swing toward each other to wipe the opposite side portions of the lasting margins inwardly over the insole. Referring to FIG. 1, the tack driver block 176 is positioned between the walls of a housing 182 and extends forwardly from the housing into a space provided by the formation of a suitable recess at the front of the lower portion of the housing. The tack driver block is secured in fixed relation to the walls of the housing by a cross pin 184 extending through the walls and through the rear portion of the block and a screw 186 extending through the left wall of the housing and into the block. Referring to FIG. 4, the base of the housing is flanged outwardly to provide tongues 188 mounted in suitable grooves in the side walls 158 of the heel band carriage 150. The wiping motions are effected by a forward movement of the housing 182 relatively to the carriage 150 effected by the operation of a piston mounted in a cylinder 190 (FIG. 1). Referring to FIG. 3, the rod 192 of the piston extends forwardly and is secured to a rear end wall 194 formed in the housing. The overwiping movements of the side wipers 178 and 180 are effected by the operation of angular levers 196 and 198 (FIG. 2) which are pivotally mounted on a headed screw 200 (FIG. 4) secured in the lower extremity of a bar 202 extending vertically downwardly from the base of the housing 182. Pivotally mounted on end portions of the levers 196 and 198, respectively, are rods 204 and 206 which extend rearwardly from the levers through suitable apertures in the end wall 160 of the heel band carriage. During the forward movement of the housing 182 two stop nuts 208 mounted on the threaded end portions of the rods 204 and 206, respectively, engage the end wall 160 of the heel band carriage. The engagement of the stop nuts with the carriage determines the point of beginning of the swinging movement of the side wipers and the stop nuts may be manually adjusted on rods 204 and 206 to vary the point of beginning of the swinging movement of the side wipers as required. It will be understood that upon the engagement of the stop nuts with the end wall of the carriage the fulcrum of each lever 196 and 198 is shifted from its center to its connection with its rod and during the continued forward movement of the housing the levers swing forwardly and operate through links 210 to swing the side wipers toward each other. During the rearward movement of the housing springs 212 surrounding the rods 204 and 206, respectively, arrest the rearward movement of the outer extremities of the levers by their engagement with washers 214 which bear against the end wall 160 thus causing the levers 196 and 198 to swing rearwardly about their pivotal connections with the rods 204 and 206 thus swinging the side wipers away from each other into their relative positions illustrated in FIG. 2. For arresting the forward movement of the wiper assembly upon the completion of the overwiping operation an L-shaped stop member 216 is secured in depending relation to the housing 182 with its horizontal portion extending forwardly for engagement with the backing plate 132 of the heel band thereby to termiante the forward movement of the wiper assembly. As shown in FIG. 2, the illustrated side wipers are pivotally mounted at the lower extremities of pins 218 secured in the forward portions of a yoke 220 embracing the lower extremity of the tack driver block 176 and secured in depending relation to the bottom of the housing 182 by screws 222.

During the rearward or retracting movement of the heel band carriage 150, a horizontal bar 226 (FIG. 4) extending outwardly from the right side wall 158 of the carriage engages a roll 228 carried by a lever 230 to operate a valve 224 thereby to open an exhaust line to permit downward movement of the jack as hereinafter described.

Upon the completion of the wiping of the upper materials over the insole on the last bottom, two tacks are driven through the overlasted margins at the back line of the upper and clenched against a metal plate at the heel end of the last bottom to secure the upper materials to the insole. The tacks are fed, by means hereinafter described, to two vertical bores 232 (FIG. 2) in the tack driver block 176 and the tacks are driven by two driving pins 234 (FIG. 8), the lower end portions of which are mounted in the bores 232. The tack driving pins are secured in the lower end portion of a piston rod 236 extending downwardly from a piston head 238 which operates in a cylinder 240 secured by suitable tie rods 242 between an upper head 244 and a lower head 246. Mounted on the piston rod 236 below the head 246 is a dump valve 248 which is mounted for vertical movement in a short cylinder 250 which is secured by the tie rods 242 between the head 246 and a head 252. Compressed air is admitted into that portion of the cylinder 240 above the head 238 through a port 254 in the head 244 and compressed air is admitted into the lower portion of the cylinder 250 through an angular port 256 formed in the head 244 and communicating with a tube 258 outside and adjacent to the cylinder 240 and confined between the heads 244 and 246. The tube 258 communicates at its lower end with a bore 260 in an extension of the head 246 which in turn communicates with a short tube 262 confined between the heads 246 and 252 and communicating with a U-shaped port 264 formed in the head 252 and communicating with the space in the cylinder 250 beneath the dump valve 248. During the downward or operating movement of the piston 236 air pressure in the tube 258 resists downward movement of the dump valve 248 and upon the completion of the downward movement of the piston the port 254 is opened to exhaust and pressure in the tube 258 passes through a one-way flapper valve formed in the dump valve member 248 and through a central opening in the head 246, applying pressure to the bottom of the piston head 238 to retract it into its position shown in FIG. 8. In the operation of the piston 238 air pressure builds up in the upper portion of the cylinder 240 until it is effective by application to the exposed upper surface of the dump valve to move the dump valve downwardly thereby to open an exhaust port 268 formed in the head 246 thus permitting the piston 238 to be operated with an explosive force sufficient to cause the driving pins 234 to drive two tacks previously fed to the lower portions of the bores 232.

Tacks are supplied to the two stations of the machine alternately from a common tack pot 270 (FIG. 1) rotatively mounted on a standard 272 secured to the top of the cabinet 24. Referring to FIG. 7, tacks flow from the tack pot 270 through two raceways 274 and are taken from the raceways one by one by a separator herein illustrated as a slide 276. As shown in FIG. 6 the slide is mounted on the upper surface of a block or casting 278 secured to the standard 272. The separator slide is moved to the right to take the leading tack from each raceway by a pneumatic piston 280 operating in a cylinder 282 secured to a bracket 284 fixed to the block 278. A rod 286 extends from the head of the piston through suitable bores in the cylinder and the bracket and has secured to its outer end a head 288 which is slotted to receive the left end portion of the separator slide. For retracting the slide a compression spring is mounted in the cylinder 282 and confined between the head of the piston and the right wall of the cylinder. Tacks taken from the raceways by the separator slide drop through suitable apertures 290 formed in the slide and thence through sleeves 292 inserted into vertical bores 294 formed in the block 278. When the tack supplying organization is in its adjustive position illustrated in FIG. 6, tacks flow from the sleeves 292 through two tack tubes 296 to the bores 232 (FIG. 2) in which operate the driving pins in the left station of the machine. The upper end portions of the tubes 296 are secured in suitable bores in a slide 298 mounted in a suitable guideway in the block 278. The registration of the tubes 296 with the bores 294 in the block 278 is determined by the engagement of the slide 298 with a stop screw 300 mounted in a bracket 302 secured to the block 278. When tacks are to be supplied to the right station of the machine the slide 298 is shifted from its position illustrated in FIG. 6 into a position in which an ear 304 projecting downwardly from the left end portion of the slide engages a stop screw 306 mounted in a bracket 308 secured to the block 278. Such adjustment of the slide brings tack tubes 310 into registration with the bores 294. It will be understood that the tubes 310 conduct tacks to the right station of the machine. The slide 298 is shifted by the operation of a pneumatic piston 312 mounted in a cylinder 314 secured to an upward extension of the bracket 308. The rod 316 of the piston 312 has threaded engagement in a suitable socket formed in the slide 298. The piston 312 is of the double-acting type and when the machine is operated in tandem the piston is operated to shift the slide 298 once in each operating cycle of the machine so that tacks are conducted alternately to the two stations.

In the operation of the illustrated machine the operator mounts a left foot shoe upper on its last and mounts the last in inverted position on the last pin 30 of the jack in the left station of the machine, and while holding the last and the upper in proper orientation relatively to the operating instrumentalities of the machine the operator depresses a treadle 318 (FIG. 1) thus shifting a valve 320 (FIG. 9) to the right from its position illustrated in said figure. Such operation of the valve 320 supplies compressed air for the following operations. First, a valve 322 is shifted to the left against the pressure of the spring 324 and thereupon compressed air flowing through the valve 322 shifts a valve 326 to the left, thus supplying pressure to the cylinders 102 which operate a later stage in the machine cycle to close the breast line grippers 82. Second, pressure is supplied to the cylinder 314 (FIG. 6) to shift the piston 312 into its position illustrated in said figure. The advancement of the piston 312 uncovers a port 328 in the cylinder 314, thus permitting the flow of compressed air through a tube 330 to the cylinder 282 in which operates the piston 280 connected to the tack selector slide. Third, a valve 332 is shifted to the right, thus opening the rod end of the cylinder 50 to exhaust through a suitable restriction provided in a valve 334. Compressed air is supplied to the head end of the cylinder 50 through the ball end of a valve 392, thus elevating the jack against the resistance of the restriction in valve 334. During the upward movement of the jack the opposite side portions of the heel end of the upper are guided into the side gripper jaws. Fourth, compressed air is supplied through a line 336 and a valve 338 to a valve 339 in the right station of the machine, said valve corresponding to the valve 326 hereinbefore referred to, thus causing the return of the operating instrumentalities in the right station to their respective rest positions as hereinafter described.

The operator now adjusts the position of the heel end portion of the upper heightwise of the last and peripherally to bring the back line of the upper into registration with the back line of the last.

Having properly positioned the upper relatively to the last and relatively to the side gripper jaws, the operator removes his foot from the treadle 318, thus permitting the return of the valve 320 to its rest position illustrated in FIG. 9 by a spring 340, thereby opening said valve to exhaust. Upon the return of the valve 320 the following operations take place. A spring 324 returns the valve 322 to its rest position illustrated in FIG. 9 and thereupon air flows through the valve 322 and the valve 326, which has been shifted to the left from its position in FIG. 9, to the pistons 102, thus closing the side gripper jaws upon the opposite sides of the heel portion of the upper. After the gripper jaws have been closed, pressure builds up in the system causing the operation of a sequence valve 344 which opens pilot lines to valves 346 and 348. Thus, valve 346 is shifted to the right as seen in FIG. 9 thereby opening to exhaust a cylinder 350 in which operates the heel band piston and the cylinder 190 in which operates the wiper piston. The operation of valve 346 also opens to exhaust a pilot line 352 communicating with the right end of a valve 354. The operation of valve 348 supplies pressure through the ball end of a valve 378 to the head end of the cylinder 350, thus causing the operation of the heel band. Further build up of pressure in the system causes compressed air flowing from the valve 348 to operate a sequence valve 356 through which compressed air flows to the head end of the cylinder 190, thus causing the operation of the wipers. Still further build up of pressure in the system causes compressed air flowing from the sequence valve 356 to operate a sequence valve 358 from which air flows through a pilot line 360 to shift the valve 354 to the right from its position illustrated in FIG. 9 and thereupon compressed air flows through a line 362 to the head end of the cylinder 240, thereby operating the tack driving piston 238 (FIG. 8).

The release of the operating instrumentalities in the left station is effected by the operation of a treadle operated valve 363 in the right station, said valve corresponding to the treadle operated valve 320 in the left station. Upon the operation of the valve 363 compressed air flows through a line 364, the valve 338 and a valve 366 to a pilot line 368, thus shifting the valve 326 to the right into its position shown in FIG. 9. Thereupon, air is exhausted from the gripper cylinders 102, thus permitting springs 365 to retract the pistons and permitting the springs 108 (FIG. 5) to open the gripper jaws. Air is exhausted from the pilots 370 and 372 of the valves 346 and 348, respectively, through the ball end of the sequence valve 344, thus permitting springs 374 and 376 to return the valves 346 and 348 to their respective rest positions illustrated in FIG. 9. Thereupon air is exhausted at a controlled rate from the head end of the heel band cylinder 350 through a restriction in a valve 378 while compressed air is applied to the rod end of the cylinder through a pressure line 380 and the valve 346. Air is exhausted through the head end of the wiper cylinder 190 through a line 382 and through the ball end of the sequence valve 356, a line 384 and the valve 348 while pressure is applied to the rod end of the cylinder 190 through the pressure line 380. Compressed air also flows through the pilot line 352, thus shifting the valve 354 to the left into its position shown in FIG. 9 and causing compressed air in the line 362 to retract the tack driving piston. During the retraction of the heel band assembly the pin 226 (FIG. 4) engages the roll 228 to shift the valve 224 to the left as seen in FIG. 9 against the pressure of a spring 388, thereby opening a pilot line 390 to pressure and shifting the valve 332 to the left into its position shown in FIG. 9, thus opening the rod end of the jack cylinder 50 to pressure through the ball end of the valve 334 and opening the head end of the cylinder to exhaust through a restriction in a valve 392, thus returning the jack to its retracted position illustrated in FIG. 1.

If it is desired to operate only one station of the machine the valve 338 is manually shifted to close the lines 336 and 364 and the release cycle is initiated by the manual operation of a valve 394 against the pressure of a spring 396 which normally holds the valve in its position illustrated in FIG. 9. To provide for the manual operation of said valve the valve stem is extended through the front of the cabinet 24 (FIG. 1) and a knob 398 is mounted on the end of the stem. Normally, the valve 394 is operated after completion of the operation of the machine but the valve may be operated at any time in the operating cycle. The operation of the valve 394 causes the valve 366 to be shifted to the right as seen in FIG. 9 by the application of pressure through a pilot line 400, thus opening the pilot line 368 to pressure and shifting the valve 326 to the right into its position illustrated in FIG. 9.

In the shaping of shoe uppers provided with thermoplastic heel stiffeners or counters it is desirable to provide a suitable heating means for rendering the counter plastic for the duration of the molding of the heel end portion of the upper in the illustrated machine. To that end a suitable steam producing means is provided in the cabinet 24 and steam is conducted therefrom through a pipe 402 extending upwardly from the top of the cabinet to two yokes 404 and 406, one positioned above the other as shown in FIG. 1. The inner portions of each yoke are perforated to provide for the emission of steam into contact with the inner surface of a thermoplastic counter stitched to the heel end portion of a shoe upper. The provision of two such yokes permits a shoe upper to remain under heat during two operating cycles of the machine which, for most thermoplastic counters, is long enough to condition the counter for the molding operation performed thereon by the heel band 130.

In the tandem operation of the machine the heel end portion of a shoe upper remains under the pressure of the heel band in one station during the interval between station operations and during part of the operating cycle in the opposite station. The duration of this period of pressure is such that enough heat dissipates from the counter to cause it to set to the shape of the last. In the event that only one station of the machine is being operated the operator will determine the duration of the period of pressure of the heel band and will time the operation of the release valve 394 accordingly.

Having thus described my invention, what I claim as new and desire to secure by Letters Patent of the United States is:

1. In a shoe machine, the combination with means for supporting a last and a shoe upper thereon of a heel band for shaping the heel end portion of the upper upon the last, a carriage on which the heel band is mounted, a fixture on which the carriage is mounted for movement lengthwise of a last in the machine toward and from its heel end, means for wiping the heel end portion of a shoe upper in over an insole on the last bottom, a carrier for the wiping means, and a structure incorporated in the carriage and arranged to mount the carrier for movement relatively to the carriage lengthwise of the last toward and from its heel end.

2. In a shoe machine, the combination with means for supporting at last and a shoe upper thereon of a heel band for shaping the heel end portion of the upper upon the last, a carriage for mounting the heel band, a pair of arms mounted on the carriage and connected to the heel band at its opposite ends, means for advancing the carriage thereby to flex the heel band about the heel end portion of a last supported in the machine, grippers constructed and arranged to engage the upper at opposite sides thereof, and means rendered operative by the advancement of the carriage for causing the grippers to tension opposite side portions of the upper from the heel end toewardly.

3. In a shoe machine, a jack for supporting a last and a shoe upper thereon, a heel band for shaping the upper about the heel end portion of the last, a carriage for the heel band, means for advancing and retracting the carriage, grippers constructed and arranged to engage the upper at opposite sides thereof, and means for operating the grippers to apply toeward tension to the upper, said means comprising a spring for each gripper, said spring being so constructed and arranged that it is loaded by the retraction of the carriage and released for operation by the advancement of the carriage.

4. In a shoe machine, the combination with means for supporting a last and a shoe upper thereon of a heel band for shaping the heel end portion of the upper upon the last, a carriage for the heel band, a carrier mounted in the carriage for movement relatively to the carriage lengthwise of the last toward and from its heel end, lasting wipers mounted in the carrier for overwiping movement, tack drivers mounted in the carrier, means mounted in the carrier for conducting tacks to the drivers, and driver operating means mounted in the carrier.

5. In a shoe machine, the combination with means for supporting a last and a shoe upper thereon of a heel band for shaping the heel end portion of the upper upon the last, a carriage on which the heel band is mounted, a table on which the carriage is mounted, a carrier mounted in the carriage for movement relatively thereto lengthwise of the last toward and from its heel end, a pair of lasting wipers mounted in the carrier, and means mounted in the carrier for effecting overwiping movements of the wipers.

6. In a shoe machine, the combination with means for supporting a last and a shoe upper thereon of a heel band for shaping the heel end portion of the upper upon the last, a carriage on which the heel band is mounted, means on which the carriage is mounted for movement lengthwise of the last toward and from its heel end, a carrier mounted in the carriage for movement relatively thereto lengthwise of the last toward and from its heel end, a pair of lasting wipers pivotally mounted in the carrier, and a complete wiper operating organization mounted in the carrier and arranged to effect overwiping movements of the wipers.

7. In a shoe machine, the combination with means for supporting a last and a shoe upper thereon of a heel band for shaping the heel end portion of the upper upon the last, a carriage on which the heel band is mounted, a table on which the carriage is mounted, a carrier mounted in the carriage for movement relatively thereto lengthwise of the last toward and from its heel end, a pair of lasting wipers pivotally mounted in the carrier, a pair of levers fulcrumed on the carrier and constructed and arranged to impart overwiping movements to the wipers, respectively, and means whereby the levers are operated by relative movement of the carrier and the carriage.

8. In a shoe machine, a jack for supporting a last and a shoe upper thereon, means for moving the jack heightwise of the last in one direction to position the upper relatively to the operating instrumentalities of the machine and in the opposite direction to return the jack to a loading position, a heel band for shaping the upper upon the heel end portion of the last, a carriage for the heel band, means mounting the carriage for movement between a rest position and a band operating position, and means operated by the return movement of the carriage to its rest position for causing the return of the jack to its loading position.

9. In a shoe machine, a jack for supporting a last and a shoe upper thereon, fluid pressure operated means for moving the jack heightwise of the last in one direction to position the upper relatively to the operating instrumentalities of the machine and in the opposite direction to return the jack to a loading position, a heel band for shaping the upper upon the heel end portion of the last, a carriage for the heel band, means mounting the carriage for movement between a rest position and a heel band operating position, and a valve operated by the return movement of the carriage to its rest position for causing the return of the jack to its loading position.

10. In a shoe machine, the combination with means for supporting a last and a shoe upper thereon of a heel band for shaping the upper upon the heel end portion of the last, a carriage for the heel band, means mounting the carriage for movement lengthwise of the last toward and from its heel end, a pair of arms mounted on the carriage and providing the sole support for the heel band, said arms being pivotally mounted at points spaced from each other widthwise of the last to an extent substantially greater than the width of the heel portion of the last, means securing the free end portions of the arms to the opposite end portions of the heel band, a plurality of lasting wipers which operate upon the completion of the operation of the heel band to wipe the lasting margin of the heel portion of the upper inwardly over an insole on the last bottom, and a carrier for the wipers, said carrier being mounted in the carriage for movement relatively to the carriage lengthwise of the last toward and from its heel end.

11. In a shoe machine, the combination with means for supporting a last and a shoe upper thereon of a heel band for shaping the upper about the heel end portion of the last, a carriage for the heel band, means mounting the carriage for movement lengthwise of the last toward and from its heel end, a pair of arms mounted on the carriage and providing the sole support for the heel band, said arms being pivotally mounted at points spaced from each other widthwise of the last to an extent substantially greater than the width of the heel portion of the last, means securing the free end portions of the arms to the opposite end portions of the heel band, a plurality of lasting wipers which operate upon the completion of the operation of the heel band to wipe the lasting margin of the heel portion of the under inwardly over an insole on the last bottom, a carrier for the wipers, said carrier being mounted in the carriage for movement relatively to the carriage lengthwise of the last toward and from its heel end, and a piston and cylinder assembly mounted on the carriage and constructed and arranged to operate the carrier.

12. A two-station shoe machine constructed and arranged for tandem operation having in each station tack driving means and characterized by a tack pot common to the two stations of the machine, raceways through which tacks flow from the tack pot, a fixed member having passages through which tacks flow from the raceways, a plurality of tack tubes for conducting tacks from said passages to the two stations of the machine, a slide in which the tubes are so mounted that tubes for the respective stations may be alternately presented to the passages, and means operating automatically to shift the slide, thereby to transfer tack delivery from one station to the other.

13. A two-station machine constructed and arranged for tandem operation having in each station operating instrumentalities including tack driving means and characterized by a tack pot common to the two stations of the machine, raceways through which tacks flow from the tack pot, a fixed block having passages through which tacks flow from the raceways, a separator for taking tacks one by one from each raceway and transmitting them to the passages, a plurality of tack tubes for conducting tacks from the passages to the two stations of the machine, the number of tubes for each station corresponding to the number of passages in the block, a slide in which the tubes are so mounted that tubes for the respective stations may be alternately presented to the passages, and means operating automatically at a predetermined time in the machine cycle to shift the slide, thereby to transfer tack delivery from one station to the other.

14. A two-station machine constructed and arranged for tandem operation having in each station operating instrumentalities including tack driving means and characterized by a tack pot common to the two stations of the machine, raceways through which tacks flow from the tack pot, a fixed block having passages through which tacks flow from the raceways, a separator for taking tacks one by one from each raceway and transmitting them to the passages, a plurality of tack tubes for conducting tacks from the passages to the two stations of the machine, the number of tubes for each station corresponding to the number of passages in the block, a slide in which the tubes are so mounted that tubes for the respective stations may be alternately presented to the passages, means operating automatically at a predetermined time in the machine cycle to shift the slide thereby to transfer tack delivery from one station to the other, and means operating after the slide has been shifted to actuate the tack separator.

15. A two-station shoe machine constructed and arranged for tandem operation, having in each station means for supporting a last and a shoe upper thereon, a carrier constructed and arranged for movement lengthwise of a last in the machine toward and from its heel end, lasting wipers mounted in the carrier and arranged to wipe the lasting margin at the heel portion of the upper in over an insole on the last bottom, a tack pot common to the two stations of the machine, a plurality of tack tubes for conducting tacks from said pot to the two stations of the machine, means in each carrier for mounting the delivery end portion of a tack tube, a tack driver mounted in the carrier, and means for causing the delivery of the tacks alternately to the two stations of the machine including a slide in which the tack tubes are so mounted that tubes for the respective stations may be alternately brought into position to receive a tack from the tack pot, and means operating automatically to shift the slide thereby to transfer tack delivery from one station to the other.

16. A two-station machine constructed and arranged for tandem operation, having in each station means for supporting a last and a shoe upper thereon, a heel band for shaping the heel end portion of the upper upon the last, a carriage for the heel band, a carrier mounted in the carriage for movement relatively to the carriage lengthwise of the last toward and from its heel end, lasting wipers mounted in the carrier and arranged to wipe the lasting margin at the heel end portion of the upper in over an insole on the last bottom, a tack driver mounted on the carrier, a tack pot common to the two stations of the machine from which tacks are supplied to the carrier in each station, means including a plurality of tack tubes for conducting tacks from the tack pot to the carriers, a slide in which the receiving end portions of the tubes are mounted, and means for shifting the slide to cause tacks to be supplied alternately to the tack tubes thereby to transfer tack delivery from one station to the other.

17. A two-station machine constructed and arranged for tandem operation, having in each station means for supporting a last and a shoe upper thereon, a heel band for shaping the heel end portion of the upper upon the last, a carriage for the heel band, a carrier mounted in the carriage for movement relatively to the carriage lengthwise of the last toward and from its heel end, lasting wipers mounted in the carrier and arranged to wipe the lasting margin at the heel end portion of the upper in over an insole on the last bottom, breast line grippers constructed and arranged to tension the heel end portion of the upper toewardly upon the last, a tack driver mounted on the carrier, a tack pot common to the two stations of the machine from which tacks are supplied to the carrier in each station, means including a plurality of tack tubes for conducting tacks from the tack pot to the carriers, a slide in which the receiving end portions of the tubes are mounted, means for shifting the slide to cause tacks to be supplied alternately to the respective tack tubes thereby to transfer tack delivery from one station to the other, and an actuator for causing the operation of the breast line grippers and the means for shifting said slide.

18. In a shoe machine, means for supporting a last and a shoe upper thereon against toeward movement, a heel band for shaping the upper upon the heel end portion of the last, a carriage for the heel band, means for advancing and retracting the carriage, a gripper constructed and arranged to engage the upper at one side of its rear portion, fluid pressure operated means for closing the gripper on the upper, and a spring for operating the gripper to apply toeward tension to the upper, said spring being so constructed and arranged that it is loaded by the retraction of the carriage and released for operation by the advancement of the carriage.

19. In a shoe machine, means for supporting a last and a shoe upper thereon against toeward movement, a heel band for shaping the upper upon the heel end portion of the last, a carriage for the heel band, means for advancing and retracting the carriage, a gripper comprising a pair of jaws constructed and arranged to engage the upper at one side of its rear portion, means mounting the gripper for movement generally toewardly of the upper, an arm projecting from one of said jaws into a position of registration with the mounting means, a fluid pressure operated piston and cylinder assembly carried by the arm and arranged to operate against the mounting means to apply closing pressure to the gripper jaws, and means for operating the gripper to apply toeward tension to the upper, said means comprising a spring constructed and arranged to be loaded by the retraction of the carriage and released for operation by the advancement of the carriage.

References Cited in the file of this patent
UNITED STATES PATENTS

| | | |
|---|---|---|
| 1,582,534 | Parks | Apr. 27, 1926 |
| 2,116,819 | Bata | May 10, 1938 |
| 2,490,900 | Eastman et al. | Dec. 13, 1949 |
| 2,754,529 | Robinson | July 17, 1956 |
| 2,878,474 | Quinn | Mar. 24, 1959 |
| 2,965,909 | Quinn et al. | Dec. 27, 1960 |
| 2,986,753 | Gilbride | June 6, 1961 |

FOREIGN PATENTS

| | | |
|---|---|---|
| 4,297 of 1911 | Great Britain | May 15, 1910 |

Disclaimer 3,096,531.—*Adelbert W. Rockwell, Jr.*, Beverly, Mass. HEEL END ASSEMBLING AND BACKPART MOLDING MACHINE. Patent dated July 9, 1963. Disclaimer filed Nov. 3, 1965, by the assignee, *United Shoe Machinery Corporation*.

Hereby enters this disclaimer to claims 1, 5 and 6 of said patent.
[*Official Gazette May 3, 1966.*]